Feb. 17, 1942.  J. W. POOLE  2,273,660
PROCESS OF REFINING BY SELECTIVE SOLVENT ACTION
Original Filed Feb. 14, 1934   2 Sheets-Sheet 1
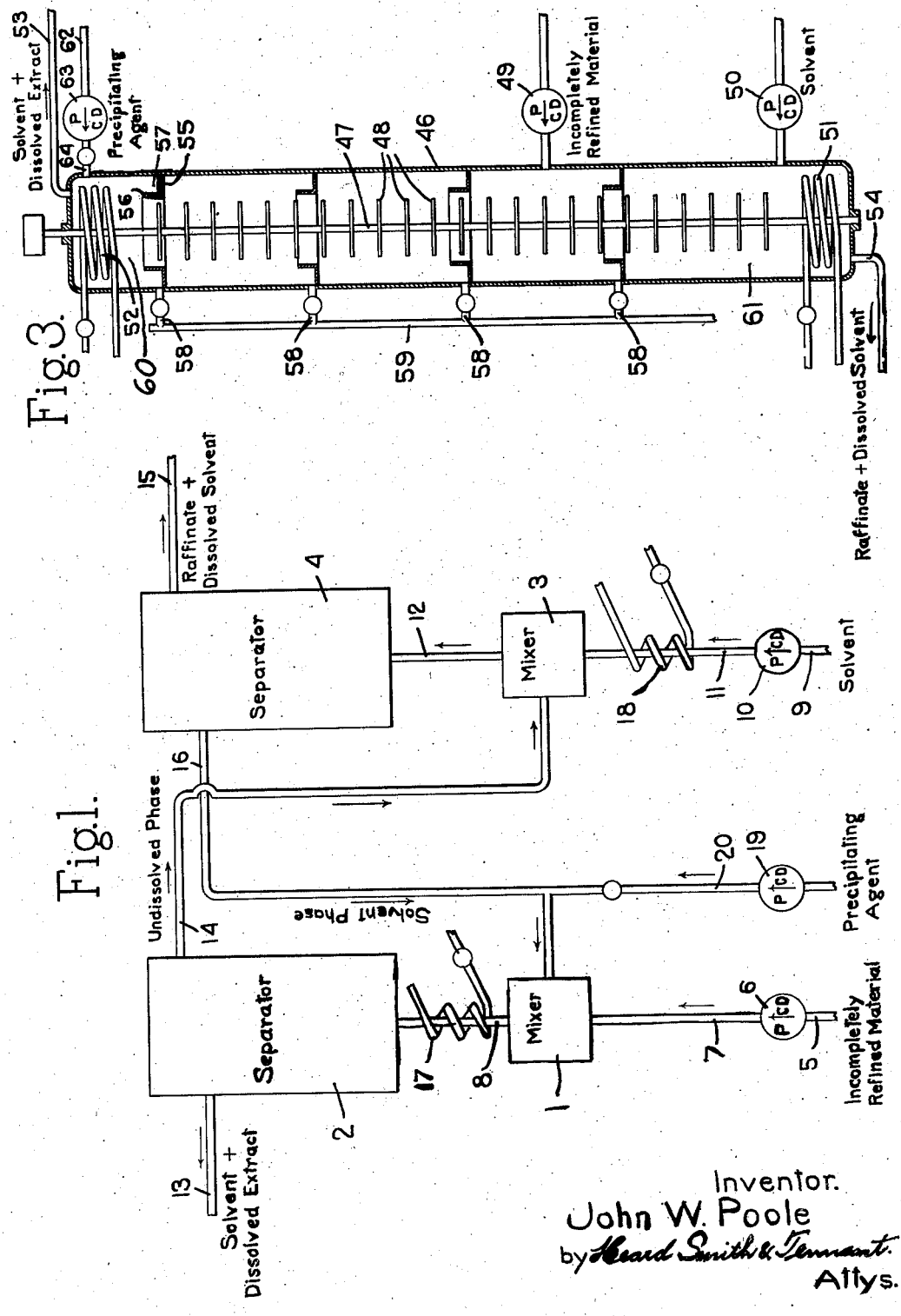
Inventor.
John W. Poole
by Heard Smith & Tennant.
Attys.

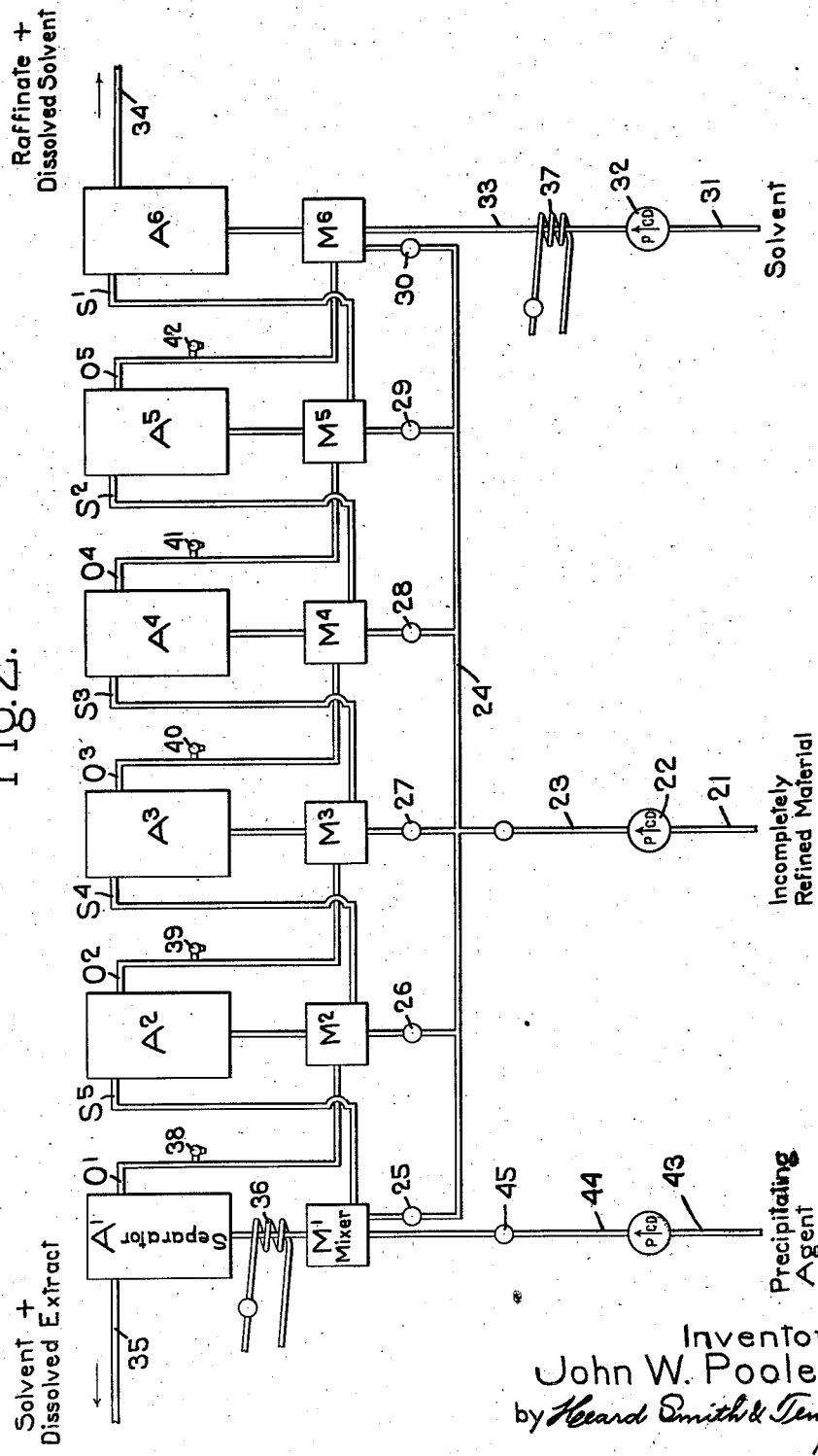

Patented Feb. 17, 1942

2,273,660

UNITED STATES PATENT OFFICE 2,273,660

PROCESS OF REFINING BY SELECTIVE SOLVENT ACTION

John Ward Poole, Jaffrey, N. H.

Original application February 14, 1934, Serial No. 711,180. Divided and this application January 12, 1938, Serial No. 185,387

13 Claims. (Cl. 196—13)

This invention relates to improvements in processes of refining by selective solvent action an incompletely refined substance, which may be a raw material, in a system in which counter-current flow of solvent and the substance to be refined is utilized, which comprises maintaining such conditions in the terminal zones from which the spent solvent and the raffinate are respectively expelled as will result in the return to the system of material whose properties are intermediate those of the raffinate and those of the extract and which would otherwise be included in the extract or the raffinate, whereby an improved result in the quality of the raffinate, the quality of the extract, the yield of the raffinate, and/or the yield of the extract will be attained.

The present application is a continuation of my application Serial No. 711,180 filed February 14, 1934, for Processes of refining by selective solvent action, which in turn is a continuation-in-part of my copending applications: Serial No. 606,763, filed April 21, 1932 (patented July 3, 1934, No. 1,965,392), for Fractionating mixtures of hydrocarbons and their derivatives; Serial No. 662,500, filed March 24, 1933 (patented October 15, 1935, No. 2,017,730), for Process for refining hydrocarbons, their derivatives, and the like; and Serial No. 675,040, filed June 9, 1933, for Process of refining mineral oil.

More specifically the invention comprises the process of refining by selective solvent action a hydrocarbon substance in a system in which a countercurrent flow of the solvent and the substance to be refined is utilized which comprises causing artificial precipitation, in the terminal zone from which the solvent containing the extract is expelled, of a hydrocarbon substance dissolved in the solvent entering the terminal zone, thereby to produce a reflux of the precipitated substance whose properties are intermediate those of the extract and those of the raffinate and which would otherwise be included in the extract, thereby causing the extracting capacity of the entire system, or such selected portion thereof as will hereinafter appear, to be available for refining the precipitated material. Such precipitation may be produced in various ways, as for example, by abruptly reducing the temperature of the solvent phase as it enters the zone from which the solvent containing the extract is expelled, or by mixing with and dissolving in said solvent phase in said terminal zone a precipitating substance miscible with the solvent phase, thereby artificially producing a reflux material which contains substances desirably to be included in the raffinate and maintaining such conditions in all other parts of the system as will cause the solvent to possess comparatively high solvent power.

By suitably regulating the intensity of the precipitating means and consequent artificial precipitation products of predetermined quality and/or yield can be produced from the extract and/or the raffinate.

The process forming the subject matter of the present invention is applicable to the refinement by solvent action of incompletely refined materials, including raw materials, comprising materials varying in solubility in various organic solvents, so that through these variations in solubility necessary and desirable separation of the various constituents may be obtained.

The present invention while applicable to solvent extraction of many mixtures of soluble materials will be more specifically described with respect to the treatment of mixtures of hydrocarbons and/or their derivatives, all of which for simplification will be referred to herein as hydrocarbons, such as petroleum and materials derived therefrom for the production of superior lubricating oils, and also for the production of more desirable asphalts.

I have discovered that certain new and useful methods of operation of solvent extraction processes bear analogies to certain principles of distillation in important commercial technology based upon these principles, reference to which will be made more clearly to explain the present invention.

For purposes of illustration and to avoid the intricacies of complete explanation of the principles of solvent extraction, highly expert chemists in this art have frequently chosen to speak of phenomena of solvent extraction in greatly simplified terms. In order to explain the most important effect of solvent extraction, that of separating an incompletely refined substance into two fractions, as in the case of petroleum products, one "paraffinic" and the other "naphthenic," the following assumptions have been made for simplification:

(1) That the material to be processed can be considered as comprising two, and only two, substances such as "paraffinic matter" and "naphthenic matter," and that in themselves these substances are homogeneous.

(2) That such two materials become mutually insoluble each in the other when in the presence of a selective solvent.

(3) That the solvent is insoluble in the undissolved material.

(4) That a component of the undissolved or raffinate portion is entirely insoluble in the solvent, or if soluble dissolves in the same manner and in the same degree as it would if pure.

In actual practice it is usually found that these assumptions are inaccurate and that due consideration must be given to the deviation from these assumptions in that complete recovery of either type of material is impossible since an unrecovered portion of each will be included in the other and the purity and quality of each thereby adversely affected.

It is believed that the degree of inaccuracy of these assumptions has not heretofore been recognized. Since this invention relates to methods of minimizing the deviations and operations in accordance with the limitations thereby imposed, a short discussion of these limitations is desirable to the complete understanding of the invention.

For the purposes of illustration I will consider a material which is a distillation cut of petroleum derived by such careful rectification that it may be considered as of essentially constant boiling point. In this petroleum cut there will exist hundreds, and perhaps thousands, of different compounds, each one of which under normal conditions of operation will be somewhat soluble in the solvent used, and likewise each will probably be soluble to a different extent from each of the others. Furthermore, they may not be divided into the two classes of comparatively insoluble and comparatively soluble material, but will vary from very slightly soluble compounds to those which by themselves would be completely miscible with a solvent. However, it is true that saturated and highly "paraffinic" material will be the least soluble and that an unsaturated and aromatic material and hydrocarbon derivatives will be highly soluble. Since all components are probably more or less soluble each in the other this mutual solubility will change the actual solubility under the conditions of operation so that after an extraction or a series of extractions has been effected, and the original material has been divided into two fractions, a raffinate and an extract, some trace of every component originally present will be found in both fractions. Consequently, if extraction of sufficient intensity is used to produce a highly "paraffinic" raffinate, there will result as a contaminant of the extract a very considerable loss of "paraffinic" matter. Conversely, if by mild extraction a highly "naphthenic" extract is produced, very considerable amounts of such material may be lost as a contaminant of the raffinate.

It is very probable that during extraction all components distribute themselves between the two phases, solvent and undissolved, according to a definite distribution ratio different for each compound. This being true, it is also true, that as the concentration of any component increases, its concentration in each phase will increase in direct ratio.

If, therefore, a system can be so controlled that a gradient of paraffinicity can be established varying from a high "paraffinicity" to a higher "naphthenicity," and spent solvent issues from the system at the terminal of high naphthenicity, then the resulting extract will be highly and correspondingly naphthenic, and the more the concentration of naphthenic materials in the solvent terminal zone is increased the more naphthenic will be the extract, and conversely as the paraffinicity of the opposite end of the system is increased there will be a corresponding increase in paraffinicity of the raffinate.

The present invention is an embodiment of these principles.

In view of such distribution ratios, it is obvious that in a two-phase system comprising an oil phase and a solvent phase that, as in distillation, each component present in an oil phase will be in such concentration as to be in equilibrium with the same component in the other phase, also present in a corresponding and definite concentration. Such is also true in distillation processes with regard to the dense and dispersed phases. As a matter of fact, it is demonstrable that in both instances the equilibrium concentrations are those at which the partial vapor pressures in the respective phases are equal.

In distillation processes the carrying agent may be considered steam; in solvent extraction processes the carrying agent is the solvent. In distillation processes the stripping force is the partial vapor pressure of each component as it exists in the mixture and under the conditions maintained. In the process by solvent extraction the force is the solubility of the component in question as it exists under the circumstances maintained. The degree of solubility of the component in question may be affected both by the solubility of the pure substance in the solvent and also by its distribution ratio between the solvent and that portion of the original material remaining undissolved.

In distillation the stripping force may be decreased by lowering the temperature and vice versa. In solvent extraction a number of alternative methods may be employed. For example, an increase in temperature will increase the driving force since the solubility of all materials will increase with increasing temperature. Stripping force may also be decreased by the use of a precipitating agent or agents soluble in the solvent. Either or both of these methods are employed in the present invention.

In usual solvent processes in which oil is refined by the use of solvent possessing greater solvent power for certain types of components than for certain other types, the raw material or incompletely refined substance, and the solvent or solvents, are passed continuously in a countercurrent flow through a succession of stages each consisting of a mixing division and a separating division. In such processes the oil or incompletely refined substance will enter and the solvent containing the dissolved matter will leave at one terminal zone which may be defined as the solvent terminal zone, while fresh solvent will enter and the refined oil or raffinate containing a small quantity of dissolved solvent will leave at the other terminal zone which may be defined as the raffinate terminal zone.

This process may also be employed in a tower in which the lighter of the two materials—the solvent or the incompletely refined substance—is introduced at or near the bottom and the heavier material introduced at or near the top of the tower. The lighter component therefore travels upwardly through the column while the heavier component travels downwardly. Some mixing device is usually employed in the tower to improve contact between the two phases and in consequence increase the effectiveness of the solvent. Whether a tower or a system of successive stages is used, the principles employed are the same.

In usual solvent extraction systems the whole system is maintained at some temperature which is considered appropriate, or only one of the materials entering the system is maintained at an appropriate temperature, it being considered that fluctuations in the temperature of the other component are so small as to be deemed unimportant, so that the operation is essentially at a fixed and predetermined temperature.

Such method is quite analogous to the stripping operation carried out by counter-current flow of steam and a material containing volatile matter in which the material containing the volatile matter is admitted at or near the top of an upright vessel and drawn off at or near the bottom of the vessel, and steam, which is admitted at or near the bottom of the vessel, flows upwardly and out through a vapor line. In this manner, fresh steam is always in contact with the material leaving the system and flows upwardly through the material which passes downwardly through the vessel, the vessel being of sufficient height to give adequate contact.

Such a process would be much more economical of steam (as isothermal counter-current solvent extraction would be economical of solvent) than would be the case if the material containing volatile matter were stripped with steam in a vessel where no counter-current flow occurred, and the material allowed to mix without restraint. To complete the analogy, in this latter case a more or less uniform temperature of such magnitude as to produce vapor pressures of the volatile material of such magnitude as to permit of satisfactory stripping action by the steam would be maintained. Such an operation would be classifiable as simple continuous distillation.

In my invention I have resorted to methods which in contrast to simple continuous distillation are analogous to continuous rectification. Rectification is effected by maintaining in a rectifying column a temperature gradient. This temperature gradient is maintained through input of heat at the bottom of a tower and removal of heat at the top of the tower. For most efficient operation for given apparatus it is necessary that the heat be removed only from the tower top as the removal of the heat at intermediate points tends to reduce the efficiency of the apparatus.

The effect of heat input at the bottom is largely to vaporize material which will contain a higher percentage of material of higher boiling point than is desirable for inclusion in the distillate. However, this vaporized portion is richer in such distillate material than is the material from which it is distilled and which is discharged from the bottom of the tower as one of the final products. The effect of the temperature gradient is to establish a corresponding concentration gradient throughout the column. This heat input will result in a greater concentration of volatile material in the upper portion of the tower.

The removal of heat at the top of the tower results largely in the condensation of material comprising both high boiling point material (which should eventually leave at the tower bottom) and material of sufficiently high volatility as to be satisfactory as distillate. Such a step will result in the heavier portion, or at least a percentage of it, eventually being forced down the tower and out at the bottom. The net result of the two steps is to secure a greater recovery of both the heavier and the lighter portions in that contaminations of both products by the other will be reduced.

For the purpose of this analogy, between solvent extraction and distillation, it is not necessary to discuss the part played by the portions of the tower intermediate of the top and bottom, or the methods by which input and removal of heat may be effected. It will suffice to say that each plate or section of the tower, to a certain degree, repeats both the effect of input and removal, neither will it be necessary to discuss the conditions in which the principle is applied in packed and plate towers.

One effect of plates is, however, pertinent to the analogy. In certain cases with the trinary or other multicomponent mixtures, it is possible to have material of such intermediate volatility characteristics as to be undesirable as a component of either the top or the bottom stream. Such material often develops a zone of maximum concentration at some intermediate point in the column. In the case of towers equipped with trays this material may be continuously discharged as a side stream, its quality and quantity being fixed by the specification requirements of the two primary products. By inserting catch basins of proper design it is also possible to withdraw side streams from a packed tower.

Another principle of rectification is, however, important in the analogy between solvent extraction and distillation which has an important bearing upon the present invention: To secure a combination of maximum purity and recovery of both types of material, it is often necessary to supply the feed at an intermediate point in the tower. Technically, the portion of the tower below the feed is called the "stripping section" and that portion above the point of feed the "rectifying section." In practice the point of feed is determined by the needs of the particular problem. It is usually desirable to introduce the feed at that point where the liquid material in the column is most similar to the feed, although there are cases in which either one section or the other may be omitted.

In carrying out analogies between rectification processes and methods of using solvent extraction, I have developed a complete mathematical and graphical statement corresponding to that on page 600 et seq. of Walker, Lewis and MacAdams, "Principles of Chemical Engineering," second edition, McGraw-Hill Book Co. 1927. If similar assumptions are made in the solvent process to those made in the above reference, the mathematics are reduced to parallel form. I have not, however, included these mathematics herein since the inclusion of all such necessary material would needlessly enlarge this specification.

A specific example of the application of this invention, using crotonaldehyde with approximately two per cent of moisture as a solvent and a Mid-Continent overhead cylinder stock of approximately 200 seconds viscosity Saybolt Universal at 210° F. is as follows: First, using a three-stage countercurrent plant consisting of mixers and centrifugal separators both the solvent and the oil terminal stages were maintained at approximately 60 degrees F. The result was to produce a raffinate of 25.8 A. P. I. in contrast to a charging stock of approximately 20 A. P. I. The extract removed had a specific gravity of approximately 1.02 and was an asphalt of approximately 80 penetration. Subsequently with no change in conditions of operation other than to increase the temperature of the raffinate terminal zone to around 100° F. results were as follows: The raffinate possessed an A. P. I. gravity of 26.3, whereas the specific gravity of the extract was decreased to approximately 1.01. In neither case did the extract contain appreciable quantities of paraffinic material since the lightest and in consequence most paraffinic distillate produced from the second extract possessed a viscosity index of around minus forty indicating extremely low paraffinicity. The net result of the operation was therefore to produce a raffinate of increased paraffinicity as shown by comparison of the A. P. I. gravities. The extract, on the other hand, although not as completely asphaltic as in the first instance, was maintained at an extremely high naphthenicity. It was found if both terminal zones of the system were maintained at 100 degrees F. (the temperature of the raffinate teminal zone) that the process became nearly inoperable, whereas the raffinate remained practically unchanged in A. P. I. gravity, its yield was very greatly reduced, while the gravity of the extract was increased to approximately 18 A. P. I.

My explanation for this is that the solvent power of the solvent was so great throughout the system that the major portion of the original charge was removed in it.

Another example of the use of this process, which illustrates the use of a precipitant in place of a temperature gradient, is as follows: A Mid-Continent neutral oil of approximately 300 seconds Saybolt Universal viscosity at 100° F. was charged to this same plant, crotonaldehyde of approximately three per cent moisture being used as a solvent, temperature was maintained essentially constant throughout the system at around 85 degrees Fahrenheit, and it was found with simple operation of this system that about fifty per cent of raffinate of between 30 and 31 A. P. I. gravity could be produced with about fifty per cent of extract. No actual determination was made of the specific gravity of this extract, but upon injecting water as a precipitant to essentially saturate the solvent phase with water at 85 degrees F. there was a resultant precipitate of about thirty per cent of the original charge, possessing a higher A. P. I. than did the original feed material, indicating in consequence a greater degree of paraffinicity.

This separated material was then returned to the system. It was found that the quantity of raffinate based on the total through-put of original stock was increased to approximately seventy per cent, with an essentially unchanged raffinate in that only .1 A. P. I. was lost.

It is, therefore, obvious that by means of the process above described a great improvement in yield of raffinate is secured and that the quality of the extract is also improved.

Operation with other solvents, such as acrolein, nitro-benzene, furfural, or phenol, is similar to the cases outlined above, except that in the case where that water is not miscible with the solvent employed a miscible precipitant such as acetone, acetaldehyde, or the like, would be necessary.

In the cases already cited the rate of feed to the system was essentially constant at about two gallons per hour. Flow of solvent in the case of Mid-Continent cylinder stock was in the ratio of two volumes of solvent to one volume of oil. In the case of the Mid-Continent neutral flow was in the ratio of one and one-half parts of solvent to one part of oil. In actual practice there should be no limit to the actual rate of feed of the two primary materials as long as the proper ratio of feed is maintained.

Any limiting factors on the magnitude of operation in a single set of units would be one of engineering rather than theoretical consideration. For instance, if centrifuges were used as separators there is both an upper limit and a lower limit of efficient design. If the bowl of the centrifuge is too small it becomes difficult of adjustment. If too large, difficulties in manufacture and balancing may result.

In the drawings:

Fig. 1 is a diagrammatic illustration of a suitable apparatus in which countercurrent flow is produced having means for performing the process above described in its simplest form;

Fig. 2 is a similar diagrammatic view of a more complete apparatus provided with means enabling it to perform the process in a manner more economical with respect to the quality and/or yield of the resulting products;

Fig. 3 illustrates apparatus of the tower type having means enabling it to perform the process herein described.

In the drawings, Fig. 1 comprises two unit stages, the first having a mixer 1 and a separator 2 of any desirable construction, such as a centrifugal separator or a U-separator, while the second stage comprises a mixer 3 and a separator 4 which also may be a centrifugal separator or a U-separator. The raw or incompletely refined material is drawn from a suitable source (not shown) through a pipe 5 by a pump 6 and forced through a pipe 7 into the mixer 1. The pressure thus maintained in the mixer forces the material through a pipe 8 into the separator 2. The solvent is similarly drawn from a suitable source (not shown) through a pipe 9 by a pump 10 which forces it through a pipe 11 into the mixer 3 and the pressure thus maintained in the mixer 3 forces the material from the mixer through a pipe 12 into the separator 4. Suitable conduits lead from the respective separators of one unit to the mixer of the other unit in such a manner that a countercurrent flow through the system is maintained and the spent solvent and extract carried thereby are discharged from the separator 2 while the raffinate and a relatively small amount of dissolved solvent are discharged from the separator 4.

The operation of the process after the system has been filled with the solvent and material to be refined and balanced is as follows: The material to be refined, after having been forced from the mixer 1 into the separator 2, is resolved into a solvent phase and an oil phase. The solvent phase containing the extract is discharged through the pipe 13, while the oil phase is discharged through the pipe 14 into the mixer 3 where it is mixed with the incoming fresh solvent and is discharged from the mixer 3 into the separator 4 where it is resolved into an oil phase and a solvent phase and the oil phase or raffinate expelled through the pipe 15. The solvent phase produced in the separator 4 is discharged through the pipe 16 into the mixer 1 from which it is forced into the separator 2 in the manner above described.

In the present invention means are provided for maintaining such conditions in those terminal zones in which the spent solvent and raffinate are respectively expelled as will result in the return to the system from the solvent terminal zone of material whose properties are intermediate those of the raffinate and those of the extract and which otherwise would be included in the extract. This is accomplished by providing heat-exchanging means of any suitable type for controlling the temperature of the fluid which is supplied to the respective separators. In Fig. 1 a coiled pipe 17, through which water may be circulated, is shown as surrounding the pipe 8, while a similar coiled pipe 18 is shown as surrounding the pipe 11 through which the solvent is supplied to the mixer 3. Suitable means, such as valves, are provided for controlling the circulation of water, steam, or other suitable heat-transporting fluid, through the respective pipes.

By suitably controlling the transfer of heat to the material passing through the pipes 8 and 11 a temperature gradient may be maintained in the system which will cause the return to the system of material whose properties are intermediate those of the raffinate and those of the extract. Some of such material will be directly precipitated and returned from the solvent zone, while other portions of such intermediate material will be returned by solution in the solvent in the raffinate zone and carried therefrom to the solvent zone. In this manner a gradient of paraffinicity is established throughout the system which will result in increased paraffinicity in the raffinate and conversely decreased paraffinicity of the extract in the spent solvent.

By abruptly reducing the temperature of the solvent phase as it enters the terminal zone from which the solvent is expelled, a portion of the hydrocarbon substance dissolved in the solvent entering the terminal zone is precipitated and a continuous reflux is produced of the precipitated substance whose properties are intermediate those of the extract and those of the raffinate and which would overwise be included in the extract. In such case such conditions of the temperature in all other parts of the system should be maintained as to cause the solvent to possess a comparatively high solvent power.

Similar results may be accomplished by introducing into and mixing with the material in the terminal zone from which the spent solvent is expelled a material miscible with the solvent used and of such nature as will cause artificial precipitation of material whose properties are intermediate those of the extract and those of the raffinate. This may be accomplished in the present invention by supplying such a material miscible with the solvent to a pump 19 from which it is forced through a pipe 20 into the mixer 1 or, as shown, into the pipe 16 from which the solvent phase is discharged from the separator 4 into the mixer 1. Such precipitation may be effected by the use of the precipitant by itself or in conjunction with the maintenance of the temperature gradient in the manner above described. In either of the conditions above stated the intensity of the precipitative means and consequent precipitation of artificial nature may be so regulated as to produce products of predetermined quality and yield.

Fig. 2 illustrates a more highly developed apparatus for performing the process forming the subject matter of the invention in which the raw or incompletely refined substance may be selectively introduced into any one of the several mixers of the system and a desirable product withdrawn as a side stream from a pipe through which the oil phase is discharged from a selected point to the left of the point of feed of the incompletely refined material.

The construction illustrated in Fig. 2 comprises a series of mixers M1, M2, M3, M4, M5, M6, of the character above described, each adapted to discharge its contents through a suitable pipe into a corresponding separator A1, A2, A3, A4, A5, A6. The raw or incompletely refined substance is supplied from a suitable source (not shown) through a pipe 21 to a pump 22 from which it is forced through a pipe 23 into a header 24 having branches 25, 26, 27, 28, 29, and 30, leading to the respective mixers M1 to M6, and provided with suitable valves to enable the raw or incompletely refined substance to be delivered to another selected mixer.

The system will be described with the assumption that the raw or incompletely refined substance is delivered to one of the intermediate mixers, for example, M3. The solvent is supplied to the mixer M6 from a suitable source (not shown) through a pipe 31, pump 32, and pipe 33. The raffinate is discharged from the separator A6, through the pipe 34, while the spent solvent and extract is discharged from the separator A1 at the opposite end of the system through the pipe 35. Suitable heat exchangers 36 and 37 are provided to maintain a temperature gradient between the separators of the zones from which the solvent and extract are expelled on the one hand and the raffinate is expelled upon the other.

In the apparatus disclosed in Fig. 2, as in that disclosed in Fig. 1, pipes O1, O2, O3, O4, O5, carry the material discharged from the separators A1 to A5 respectively to the mixers M2 to M6, respectively, while pipes S1, S2, S3, S4, S5, deliver the solvent phase from the respective separators A6 to A2 to the mixers M5 to M1 respectively. The pipes O1 to O5 respectively may be provided with branch pipes 38, 39, 40, 41, 42, having suitable valves from which a side stream of a desirable material may be selectively removed from any one of the pipes carrying the oil phase.

Assuming that the raw or incompletely refined substance is introduced into the mixer M3, the operation indicated in Fig. 2 is, excepting for the stages comprising the separators A1 and A2, essentially the same as the process described in respect to Fig. 1. However, precipitation of the dissolved material is brought about in the stage corresponding to separator A1, instead of the stage corresponding to separator A3, and the precipitated material is returned to the rest of the system through the pipe O1. It will be noted that artificial precipitation is brought about exclusively in the separator A1, thereby insuring the benefit of the entire system for extraction of the precipitated material. In some instances it is possible that this precipitated material will be so lean in materials worthy of inclusion in the raffinate that it may be desirable to remove a portion of it and this can be accomplished by the removal of a side stream from one of the pipes 38 or 39. This is analogous to the removal of the side stream of a rectifying column.

The raw material being introduced to mixer M3 where it is mixed with the solvent phase issuing from separator A4 through pipe S3 and expelled to separator A3 from which the undissolved portion will continue in a similar manner consecutively to mixer M4, separator A4, mixer M5, separator A5, mixer M6, separator A6, from which it is expelled from the system as a finished raffinate containing small quantities of dissolved solvent.

The fresh solvent is introduced as heretofore described to mixer M6 from whence it passes to separator A6, mixer M5, separator A5, mixer M4, separator A4, mixer M3, separator A3, mixer M2, separator A2, mixer M1 and separator A1 from which it is expelled as spent solvent containing the extract. In the course of such operation mixers M1 to M6 and separators A1 to A6 perform the functions heretofore described and may be employed in any desirable number. Where the hydrocarbon substance is fed into the system at a point other than that from which the spent solvent is expelled, a portion of the extractive system is reserved for preliminary partial refinement of the reflux before any portion of said reflux is returned to the point of feed.

In the performance of the process by the apparatus above described the portion of the apparatus to the left of feed may be considered analogous to a rectifying system, in that its operation results in increased purity of the extract, while that portion of the apparatus which is to the right of the feed is analogous to a stripping section in that its operation results in a high removal of extract, or conversely a high purity of raffinate. It therefore follows that the process heretofore described will result in a maximum yield and purity of both extract and raffinate.

By providing means for selectively supplying the raw or incompletely refined substance to any mixer of the series a delicate control may be maintained in respect to the refinement of any particular material by properly correlating the condition of the terminal zone, the point of feed of the incompletely refined substance, and the point of removal of the intermediate material with the qualities and yields of the products.

The material whose properties are intermediate those of the raffinate and those of the extract may be precipitated into and returned to the system in the apparatus disclosed in Fig. 2 by introducing a suitable precipitant into the mixer M1 at the solvent terminal zone. It will be noted that the precipitating material is injected into the terminal zone from which the spent solvent is expelled from the system, thereby insuring to the material precipitated therein the benefit of the entire extractive system. Any suitable means may be provided for injecting the precipitant into the mixer M1 as, for example, a pump 43 in a pipe line 44 leading from a suitable source of supply to the mixer M1 or pipe 25, the pipe 44 being provided with a valve 45 which will enable the selective use of the precipitant.

The apparatus disclosed in Fig. 3 comprises an upright vessel or tower 46, preferably of cylindrical form, having mounted therein a rotating vertical shaft 47 driven in any suitable manner (not shown) and provided with a series of mixing arms or paddles 48 and having a feed pipe 49, preferably intermediate of its length through which the raw or incompletely refined substance is introduced into the vessel. The solvent is introduced through a pipe 50, preferably at a point beneath the feed of the raw material and at a suitable distance above the bottom of the vessel. A suitable heat-exchanging device 51, such as a coiled pipe through which water, steam, or other suitable fluid, is circulated, is located in the bottom of the vessel preferably below the point at which the solvent is introduced, and a heat exchanger 52 through which a suitable heat exchanging fluid is circulated is located in proximity to the top of the vessel. A discharge pipe 53 for the spent solvent with the dissolved extract therein communicates with the vessel preferably at its highest point, while a similar discharge pipe 54 for the raffinate communicates with the vessel preferably at its lowest point.

Desirably one or more annular catch basins are provided intermediate of the length of the tower. These catch basins may be of like construction and comprise a horizontal base 55 fitting tightly within and secured to the cylindrical wall of the vessel and an upwardly extending annular flange 56 located at a suitable distance from the wall of the vessel to provide a catch basin 57.

In the operation of the device the heavier material will deposit in the bottom of the catch basin until it fills the catch basin and overflows into the descending stream. This heavier material may be drawn off in any suitable manner as by pipes 58 which may be discharged into a suitable receptacle or may communicate with a header 59, suitable valves being provided in the pipes 58 to enable the heavier material to be drawn off from any selected catch basin.

The operation of the apparatus shown in Fig. 3 is as follows: It being assumed that in the operation the solvent constitutes the lighter of the two primary materials entering the system; such being the case the incompletely refined or raw material will enter the system through the pipe 49, from thence continuing downwardly through the vessel. Concurrently, the solvent is introduced through the pipe 50 continuing upwardly through the vessel, being maintained in intimate contact with the incompletely refined or raw material by the action of the mixing device 47 and 48. After passing the pipe 49 through which the raw material is introduced the solvent continues upwardly to the solvent clarifying zone 60 at the top of the vessel at which zone artificial precipitation of a material whose characteristics are intermediate of those of the extract and those of the raffinate is effected in the manner heretofore described.

By reason of the temperature gradient thus maintained in the vessel by means of the heat exchangers 51 and 52 a gradient of paraffinicity is established so that material of high paraffinicity will be concentrated at the lower portion or clarifying zone 61 of the vessel, and conversely material of high naphthenicity or low paraffinicity will be concentrated at the top of the vessel, whereby an extract of increased naphthenicity and a raffinate of increased paraffinicity will be discharged respectively from the pipes 53 and 54. In such cases as there may exist a considerable portion of material intermediate in characteristics of the desired extract and the desired raffinate, such material may be withdrawn from a catch basin located at such selected height in the vessel as may determine the character of the intermediate material to be withdrawn.

Means may also be provided for alternatively introducing a precipitant into the solvent terminal zone to precipitate material having characteristics intermediate of those of the extract and those of the raffinate as in the apparatus previously described. This may be accomplished by drawing the precipitant from a suitable source (not shown) through a pipe 62 by a pump 63 and injecting the same through a pipe 64 into the clarifying zone 60 at the upper end of the vessel. Where a precipitant is thus employed the temperature at both ends of the vessel may be maintained equal, or by the previously designated apparatus the precipitant may be used conjointly with the proper temperature gradient, in either case correlating the amount of precipitated material to the quality and yield of the products.

By reason of the present invention therefore when employed in the treatment of petroleum, or other base materials for the production of lubricating oil, a maximum yield of highly refined oil is recovered as the raffinate, while lubricating oils which are commercially useful but of less desirable quality may be recovered from the side stream.

While the process of solvent extraction is defined herein as applied to the recovery of lubricating oil from an incompletely refined substance, such as a petroleum cut, it is obviously applicable to the solvent separation of other incompletely refined or raw materials comprising components which vary in solubility with respect to the solvents used. The disclosures therefore of the particular uses of the process herein described are of an illustrative character and are not restrictive of the meaning and scope of the following claims.

What I claim is:

1. In a process for refining hydrocarbon mixtures by the action of a selective solvent in a continuous countercurrent operation wherein a raffinate phase passes countercurrent to and in contact with an extract phase, and in which an extract is discharged from the countercurrent operation at a terminal stage, the improvement which comprises continuously mixing a precipitating agent soluble in the solvent with and dissolving it in the solvent in said terminal stage thereby to continuously produce a precipitate comprising a portion of the dissolved hydrocarbons having properties which are intermediate those of the extract and raffinate, passing the resulting precipitated hydrocarbons from said terminal stage countercurrent to said extract phase, and maintaining the conditions in all other parts of the countercurrent extraction operation such as will maintain the solvent at an essentially constant solvent power of predetermined optimum efficiency.

2. A process for refining hydrocarbon mixtures as defined in claim 1 in which said improvement further comprises the use of crotonaldehyde as the selective solvent in the countercurrent operation.

3. A process for refining hydrocarbon mixtures, which comprises subjecting the hydrocarbon to be refined to the action of crotonaldehyde as a selective solvent in a continuous countercurrent operation wherein a raffinate phase passes countercurrent to and in contact with an extract phase, an extract being discharged from the countercurrent operation at a terminal stage, continuously mixing acetaldehyde as a precipitating agent soluble in the solvent with and dissolving it in the solvent in said terminal stage thereby to continuously produce a precipitate comprising a portion of the dissolved hydrocarbons having properties which are intermediate those of the extract and raffinate, passing the resulting precipitated hydrocarbons from said terminal stage countercurrent to said extract phase in said countercurrent operation, and maintaining conditions in all other parts of the countercurrent extraction operation such as will maintain the solvent at an essentially constant solvent power of predetermined optimum efficiency.

4. The process of refining a hydrocarbon substance by the selective solvent action of crotonaldehyde in a system in which continuous countercurrent flow of crotonaldehyde and said substance is utilized which comprises causing precipitation of a portion of the hydrocarbon substance dissolved in the crotonaldehyde entering the terminal zone from which the solvent phase is expelled from the system by introducing into, mixing with and dissolving in said solvent phase in said terminal zone, water, thereby to produce a reflux material which contains substances desirably to be included in the raffinate but which would otherwise be included in the extract, and maintaining such conditions in all parts of the extractive system as will cause the solvent to possess a comparatively high solvent power.

5. The process of refining a hydrocarbon substance by the selective solvent action of crotonaldehyde in a system in which continuous countercurrent flow of crotonaldehyde and said substance is utilized which comprises causing precipitation of a portion of the hydrocarbon substance dissolved in the crotonaldehyde entering the terminal zone from which the solvent phase is expelled from the system by introducing into mixing with and dissolving in said solvent phase in said terminal zone, acetaldehyde, thereby to produce a reflux material which contains substances desirably to be included in the raffinate but which would otherwise be included in the extract, and maintaining such conditions in all parts of the extractive system as will cause the solvent to possess a comparatively high solvent power.

6. A process for the separation of oil into paraffinic and non-paraffinic fractions which comprises commingling said oil with a selective solvent and thereby forming a raffinate phase containing paraffinic oil fractions and an extract phase containing selective solvent and dissolved oil fractions, separating said phases, commingling said extract phase with an anti-solvent, said anti-solvent being more soluble in the extract phase than in the raffinate phase and adapted to cause separation of the extract phase into two layers, one layer containing oil fractions relatively more paraffinic in character than the other of said layers, separating said layers, returning the more paraffinic oil layer to the extraction system, and maintaining the conditions in all other parts of the extraction system such as will maintain the solvent at an essentially constant solvent power of predetermined optimum efficiency.

7. A process for the separation of oil into paraffinic and non-paraffinic fractions which comprises commingling said oil with a selective solvent and thereby forming a raffinate phase containing paraffinic oil fractions and an extract phase containing selective solvent and dissolved oil fractions, separating said phases, commingling said extract phase with an anti-solvent, said anti-solvent being more soluble in the extract phase than in the raffinate phase and adapted to cause separation of the extract phase into two layers, one layer containing oil fractions relatively more paraffinic in character than the other of said layers, separating said layers, returning the more paraffinic oil layer to the extraction system at a point between the points of introduction of oil to, and extract phase removal from, said system, and maintaining the conditions in all other parts of the extraction system such as will maintain the solvent at an essentially constant solvent power of predetermined optimum efficiency.

8. The process of refining a hydrocarbon substance by selective solvent action in a system in which continuous countercurrent flow of the solvent and substance is utilized, which comprises causing precipitation of a portion of the hydrocarbon substances dissolved in the solvent entering the terminal zone from which the solvent phase is expelled from the system by introducing into, mixing with and dissolving in said solvent phase in said terminal zone a precipitating substance miscible with said solvent phase and by abruptly reducing the temperature of the solvent as it enters the terminal zone, thereby to continuously produce a reflux of precipitated substance the properties of which are intermediate those of the extract and the raffinate and which would otherwise be included in the extract, and maintaining such conditions in all other parts of the system as will cause the solvent to possess a constant comparatively high solvent power.

9. A process for the separation of oil as defined by claim 6 in which said selective solvent is crotonaldehyde.

10. The process of refining a hydrocarbon substance as defined by claim 8 in which said selective solvent is crotonaldehyde.

11. A process for the separation of oil into paraffinic and non-paraffinic fractions, which comprises commingling said oil with a selective solvent from the group consisting of crotonaldehyde, acrolein, nitrobenzene and furfural, and thereby forming a raffinate phase containing paraffinic oil fractions and an extract phase containing selective solvent and dissolved oil fractions, separating said phases, commingling said extract phase with an anti-solvent from the group consisting of water, acetone and acetaldehyde, said antisolvent being more soluble in the extract phase than in the raffinate phase and adapted to cause separation of the extract phase into two layers, one layer containing oil fractions relatively more paraffinic in character than the other of said layers, separating said layers and returning the more paraffinic oil layer to the extraction system.

12. The process of refining a hydrocarbon substance by the selective solvent action of a solvent selected from the group consisting of crotonaldehyde, acrolein, nitrobenzene and furfural in a system in which continuous countercurrent flow of solvent and substance is utilized, which comprises causing precipitation of a portion of the hydrocarbon substance dissolved in the solvent entering the terminal zone from which the solvent phase is expelled from the system by abruptly reducing the temperature of the solvent as it enters the terminal zone and by introducing into, mixing with, and dissolving in said solvent phase in said terminal zone a precipitating substance miscible with said solvent phase selected from the group consisting of water, acetone and acetaldehyde, thereby to continuously produce a reflux of precipitated substance, the properties of which are intermediate those of the extract and the raffinate and which would otherwise be included in the extract, and maintaining such conditions in all other parts of the system as will cause the solvent to possess a comparatively high solvent power.

13. A process for the separation of oil containing paraffinic and non-paraffinic constituents into fractions containing such constituents, which comprises commingling said oil with a selective solvent and thereby forming a raffinate phase containing paraffinic oil fractions and an extract phase containing selective solvent and dissolved oil fractions, separating said phases, abruptly reducing the temperature of the separated extract phase and commingling therewith a precipitating sustance miscible with said solvent, said precipitating substance being more soluble in the extract phase than in the raffinate phase and adapted to cause with said temperature reduction a separation of the extract phase into two layers, one layer containing oil fractions relatively more paraffinic in character than the other of said layers, separating said layers and returning the more paraffinic oil layer to the extraction system.

JOHN WARD POOLE.